United States Patent [19]

Hauk et al.

[11] 4,244,820

[45] Jan. 13, 1981

[54] FLUID PURIFICATION SYSTEM

[75] Inventors: Dale I. Hauk, Pinckney; Gerald B. Tanny, Ann Arbor, both of Mich.

[73] Assignee: Gelman Instrument Company, Ann Arbor, Mich.

[21] Appl. No.: 906,499

[22] Filed: May 16, 1978

[51] Int. Cl.[3] .......... B01D 31/00

[52] U.S. Cl. .......... 210/194; 210/456; 210/321.3; 210/433.5; 210/500.2

[58] Field of Search .......... 210/456, 433 M, 321 A, 210/321 B, 321 R, 493 M, 487, 351, 194

[56] References Cited

U.S. PATENT DOCUMENTS

| | | | |
|---|---|---|---|
| 2,687,997 | 8/1954 | Marchand | 210/321 A |
| 2,883,058 | 4/1959 | Jaume | 210/487 |
| 3,401,798 | 9/1968 | Hyrop | 210/321 R |
| 3,442,388 | 5/1969 | Pall | 210/321 B |
| 3,780,870 | 12/1973 | Esmond | 210/321 B |
| 3,813,334 | 5/1974 | Bray | 210/487 X |
| 3,862,031 | 1/1975 | Leonard | 210/493 M X |
| 3,867,294 | 2/1975 | Pall et al. | 210/492 X |
| 3,948,777 | 4/1976 | Murata et al. | 210/321 R |
| 3,984,324 | 10/1976 | Wang | 210/321 R X |
| 3,993,556 | 11/1976 | Goldberg et al. | 210/433 M |
| 4,022,692 | 5/1977 | Janneck | 210/321 B |
| 4,028,252 | 6/1977 | Morris | 210/493 M X |
| 4,178,248 | 12/1979 | Purter et al. | 210/433 R |

FOREIGN PATENT DOCUMENTS

| | | | |
|---|---|---|---|
| 1306556 | 2/1973 | United Kingdom | 210/321 B |
| 1338373 | 11/1973 | United Kingdom | 210/321 B |
| 1351433 | 5/1974 | United Kingdom | 210/321 B |

*Primary Examiner*—Frank A. Spear, Jr.

*Attorney, Agent, or Firm*—Reising, Ethington, Barnard, Perry & Brooks

[57] ABSTRACT

A fluid purification system for performing filtration of particles from a feed liquid by a tangential flow of the feed liquid over a membrane surface. In one embodiment, the purification system includes a filter cartridge contained within a filter housing having ports permitting ingress and egress of feed liquid and filtrate. The cartridge includes a filter element having a layered construction with a thin flow channel between the layers. One layer of the filter element is formed of a sheet of impervious material defining one wall of the thin flow channel. Another layer of the filter element is spaced from the one layer and formed of a sheet of permeable membrane material and defines another wall of the thin flow channel. The spacing between the walls of the thin flow channel is maintained by a sheet of reticular material that provides turbulence in the thin flow channel to promote cross flow filtration. The filter element is formed into a pleated, cylindrical shape with a flow axis parallel to the pleats.

24 Claims, 9 Drawing Figures

FLUID PURIFICATION SYSTEM

TECHNICAL FIELD

This invention relates to fluid purification systems, and more specifically to a filtration system for removing particles or other forms of contaminants from a liquid carrier through cross-flow filtration. The invention has particular applicability to ultrafiltration systems and is described in detail in connection therewith, although it is adaptable to the several forms of cross flow filtration systems including dialysis.

BACKGROUND ART

The term crossflow filtration is applied to filtrative processes in which the fluid flow through a semipermeable barrier is accommpanied by a transverse flow over the plane of the barrier. The purpose of the transverse flow is to create hydrodynamic conditions which maintain or minimize the concentration of certain components within the fluid boundary layer adjacent to the semipermeable barrier. This effect maintains a desired level of fluid permeation through the semipermeable barrier and is essentially independent of the nature of the barrier. For microfiltration, the fluid to be treated contains microparticulate matter, and the barrier or membrane may contain holes or pores as small as 250 Å. Membranes with smaller openings are used for the process of ultrafiltration which removes dissolved macromolecular species. When the openings are smaller than 100 Å the membrane will show some exclusion of small molecules and ions, and the process is given the name reverse osmosis or hyperfiltration. The nature of these processes is generally described in S. T. Hwang and K. Kammermeyer, "Membranes in Separations", Vol. VII in the series "Techniques in Chemistry", Ed. A. Weissberger, J. Wiley & Sons, (1975).

Included among these cross-flow filtration configurations or geometries are the large tubular membrane modules, the plate and frame modules and the spiral wound modules. A brief identification of each of these membrane configurations along with associated advantages and disadvantages in performance and operation will next be given.

The cylindrical tubular membrane is generally cast onto the inside of a porous backing tube or inserted loose into a porous tube and sealed at both ends. The liquid carrier is fed through the central opening of the membrane and permeates out radially through the walls of the membrane. The unfiltered liquid carrier is then continuously recirculated through a closed path until the desired amount of filtration is achieved. The advantages of a cylindrical tubular membrane is that it is easy to clean physically and chemically, does not easily block and is simple to remove and replace. Its disadvantages lie in the fact that it has a relatively small membrane surface-to-volume ratio, and has a relatively large "hold-up volume" of fluid within it.

The plate and frame configuration tangential flow module comprises a set of spaced parallel plates of membrane material with spacers interspersed between the plates. The liquid carrier is passed across the surfaces of the membranes at high velocity. The liquid that permeates through the membranes is drawn off through an interspace between coupled pairs of membranes. The advantages of the plate and frame filtration module include its relatively high membrane surface-to-volume ratio, low process fluid pumping costs, and ease of isolation of small areas in the event of leakage. Its disadvantages lie in its generally uneven flow patterns which facilitates stagnation in some areas and difficulty in cleaning and blocking due to the narrow channel through which the liquid carrier has to pass.

The spiral wound filtration module is formed by interleaving a porous sheet between two rectangular sheets of membrane material and sealing three sides of the resultant sandwich-like arrangement. The unsealed side is placed in fluid communication with a cylindrical tubular member that forms a header for the removal of permeate or filtrate. The sandwich-like structure is rolled in spiral fashion around the cylindrical tube. The liquid carrier to be filtered is pumped through the spiral-wound filtration module from one end to the other along the longitudinal axis of the module. As the liquid carrier passes over the membrane surface liquid permeates through the surface to the porous sheet which functions as a permeate collection material. The permeate flows in circular, spiral-like fashion until it reaches the inner tubular member where it is collected and channeled out of the filter. The advantages of the spiral-wound filtration module include its high membrane surface-to-volume ratio. However, that is offset by two distinct disadvantages. First, the spiral-wound module design requires that the permeate flow circularly around the spiral until it reaches the cylindrical tubular member where it can exit from the filter, and this relatively lengthy circular flow path can involve a significant pressure drop. Secondly, even one small leak in the spiral-wound filtration module generally requires the isolation of a significant portion of the total membrane area to identify and correct the leak.

Against this background of the prior art, an objective of the present invention is to provide a cross-flow filtration module design that has a relatively high membrane surface-to-membrane volume ratio, has relatively low susceptibility to blockage, does not require a significant pressure drop for the discharge of permeate or filtrate, and has ease of isolation of small areas in the event of leakage.

DISCLOSURE OF THE INVENTION

The present invention is a tangential flow fluid purification system based on an improved filter module design. The filter module incorporates a filter element having a layered construction that affords the present purification system the enumerated advantages of the prior art, without the offsetting disadvantages.

More specifically, the filter element used in the present fluid purification system has a layered construction with a thin flow channel defined between the layers. In the basic embodiment the layered construction includes one wall formed of a sheet of impervious material; another wall, spaced from the one wall, formed of a sheet of permeable membrane material having a preselected porosity; and a spacer formed of a sheet of perforated material interposed between the two walls. The spacer maintains the spaced relationship between the walls to define the thin flow channel therebetween, and when an appropriate material, such as "Vexar" is used, it further tends to induce turbulence in liquid flow along the flow channel, thereby promoting mass transfer through the membrane wall.

In one form of the invention, the filter element is pleated and formed into a cylindrical shape with a seam joining its opposed lateral edges. The pleated, cylindrical filter element is contained within a cartridge body. The cartridge body is in turn disposed within a filter housing that has a feed inlet port, feed outlet port, and filtrate port. The cartridge body has mounted exteriorly on it an annular member that maintains proper positioning of the cartridge within the filter housing, and also forms a seal against the interior wall of the filter housing to effectively isolate the feed inlet port from the feed outlet port.

In operation of the fluid purification system of the present invention, a stream of unfiltered feed liquid flows under pressure through the inlet port into an enclosed chamber to volume bounded by the underside of the annular member, the cartridge body and the filter housing. The unfiltered liquid is then introduced, still under pressure, into the thin flow channel within the layers of the filter element. The liquid flows along the longitudinal axis of the thin flow channel and across the membrane surface which forms one wall of the flow channel. The pressure drop across the membrane in the thin flow channel causes the permeation of filtrate through the membrane surface. The filtrate is collected and channeled off by a porous central tube within the cartridge body. The balance of the unfiltered feed liquid then flows out of the thin flow channel at the other end of the filter element and into another enclosed chamber or volume bounded by the upper side of the annular member, the cartridge body and filter housing. Finally, the feed liquid is discharged through the feed outlet port. The discharged feed liquid may be recirculated for additional filtration by reintroducing it into the stream entering the feed inlet port.

In another feature of the invention, the relatively impermeable wall of the filter element can be formed to have a small number of pores that are sufficiently large to be pervious to the feed liquid, including particles or contaminants it carries. In this manner, a controlled quantity of feed liquid can permeate through this wall and join the flow part way along the flow channel instead of entering the flow channel at its normal ingress opening. This controlled amount of permeation tends to linearize the pressure drop along the entire distance of the flow channel, which, in turn, tends to optimize the productivity of the filtration process by reducing the pressure differential between the ingress and egress opening of the flow channel without a proportionate decrease in the mass flux of feed liquid through the channel.

In another form of the invention, the fluid purification system may be used for diafiltration and/or for dialysis. The housing is provided with two pair of ports, one for feed liquid and another for dialyzate. The filter element includes another thin flow channel through the addition of another layer of impervious sheet material. Both flow channels share a common membrane boundary that permits mass transfer between the channels. One thin flow channel and pair of ports permit the flow of feed liquid through the filter element in one direction, and the other thin flow channel and pair of ports permit the flow of dialyzate through the filter element in another, opposite direction. For the process of diafiltration the feed liquid compartment would also be pressurized.

The feature of providing a limited number of nonselective pores in the impervious sheet material is adaptable to this form of the invention.

Other advantages of the present invention will be readily appreciated as the same become better understood by reference to the following detailed description when considered in connection with the accompanying drawings.

BEST MODE FOR CARRYING OUT THE INVENTION

Figure 1:
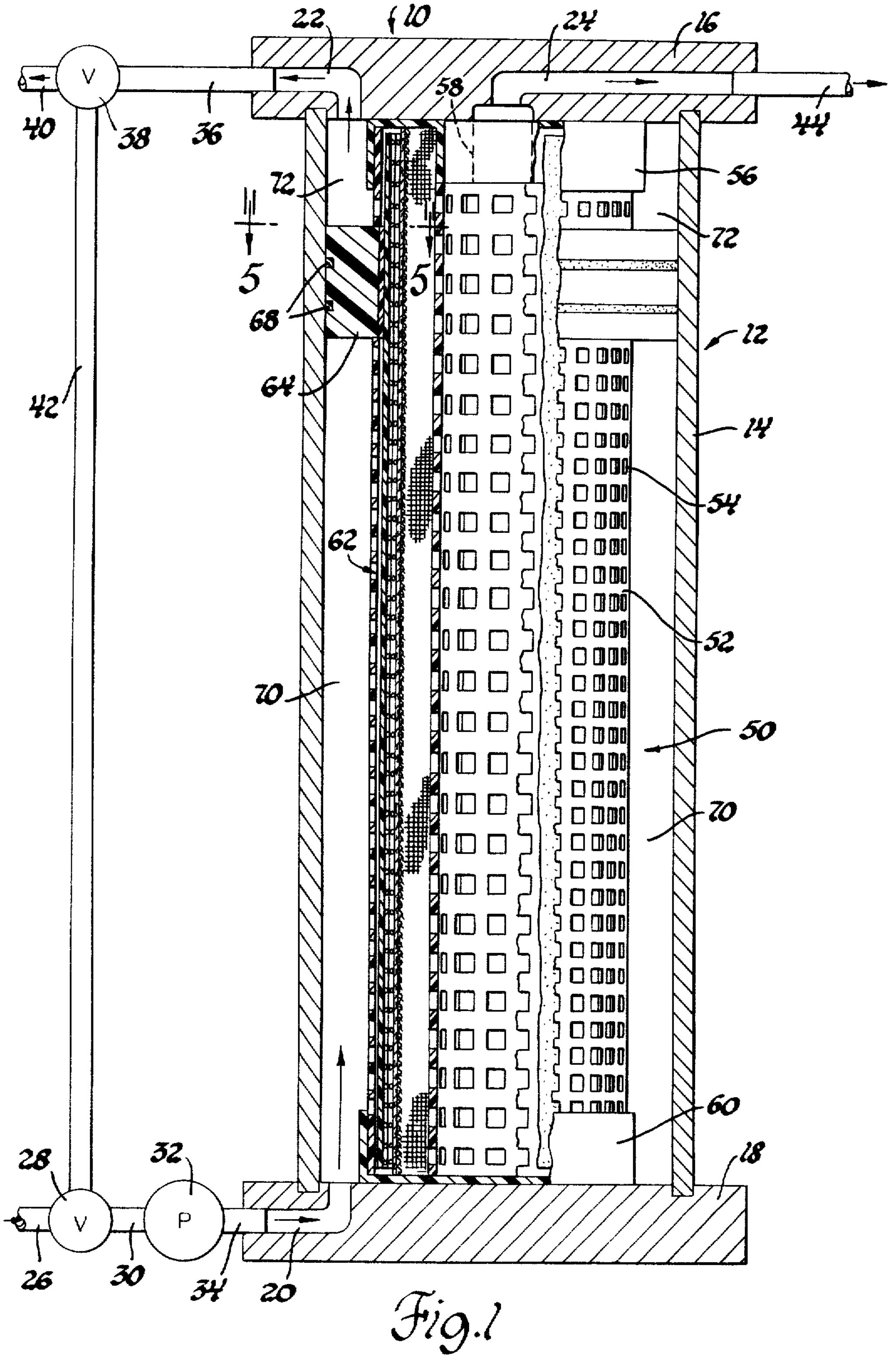
FIG. 1 is an elevational view in partial section of a fluid purification system in accordance with the present invention.

A fluid purification system in accordance with the present invention is shown generally at 10 in FIG. 1. The fluid purification system 10 performs the filtration of particles—suspended, dispersed or emulsified—and of large dissolved molecules by a cross-flow process. In the process, a feed liquid flows tangentially across the surface of a membrane wall and the liquid or permeate transfers through the wall to be collected and channeled off.

The fluid purification system 10 includes an outer cylindrical housing 12. The housing 12 is formed of a hollow cylindrical body 14 that is sealed at its upper end by a removable cap 16, and at its lower end by a cap 18.

The lower cap 18 has a feed inlet port 20 formed as a channel within it to permit the inflow of unfiltered feed liquid containing particles or other contaminants. The upper cap 16 has a feed outlet port 22 formed as a channel within it to permit the outflow of concentrated feed liquid. The upper cap 16 also has a filtrate port 24 formed within it as a channel that permits the overflow of filtrate from the filtration system.

A stream of unfiltered feed liquid flows in a fluid line 26 to a valve 28. The valve 28 operates in cooperation with another valve 38 to control recirculation of the feed liquid in a manner to be hereinafter described. The valve 28 is connected by a fluid line 30 to a pump 32 that provides a pressure differential sufficient to force the circulation of the feed liquid through the filtration system 10. The pump 32 is connected to the feed inlet port 20 by a fluid line 34 that is received within the inlet port.

The flow from the feed outlet port 22 contains concentrated, unfiltered feed liquid. This flow enters into a fluid line 36 that is received within the outlet port 22. The fluid line 36 connects to the valve 38. The valve 38 and the previously mentioned valve 28 cooperate to permit recirculation of the feed liquid through a fluid line 42 communicating the feed inlet port 20 and the feed outlet port 22. If recirculation of the feed liquid is desired, valve 38 is set to divert the desired fraction of the flow within fluid line 36 into the fluid line 42, and the valve 28 is cooperatively set to receive the flow through line 42 and channel it into fluid line 34.

The filtrate flows out the filtrate port 24 into a fluid line 44 received within the filtrate port. The fluid line 44 may connect to a storage device (not shown).

A filter cartridge or module 50 is contained within the housing 12. The cartridge 50 has a generally cylindrical shape defined by an outer wall 52 formed of a semi-rigid plastic material. The outer wall 52 has a regular array of large apertures, as for example aperture 54, that permit the relatively free passage of feed liquid through its surface. The main purpose of the outer wall 52 is to provide support when the cartridge is cleaned by back flushing through fluid line 44.

An upper cap 56 closes all but a central opening 58 in the upper end of the cartridge 50. The central opening 58 communicates the filtrate port 24 with a central flow path in a manner to be hereinafter more fully discussed. The upper cap 56 is secured to the cylindrical wall 52 with a water and/or solvent resisting glue.

A lower cap 60 closes the entire lower end of the cartridge 50. The cap 60 is likewise secured to the cylindrical wall 52 by water and/or solvent resisting glue.

The cartridge 50 performs filtration by means of a filter element, generally indicated at 62. As will hereinafter be described more specifically in connection with FIGS. 2, 3, 4 and 5, the filter element 62 comprises a layered construction that is pleated and formed into a cylindrical shape. The actual filtration occurs within a thin flow channel defined within the layers of the filter element 62.

The cartridge 50 further includes a spacer ring 64 mounted exteriorly along the longitudinal axis of the cartridge, preferably near the open end. The outer circumferential surface of the spacer ring 64 has formed in it two circumferential tracks that contain O-rings 68 that function as a gasket to provide a fluid seal between spacer ring 64 and the inner wall of the housing body 14.

Figure 5:
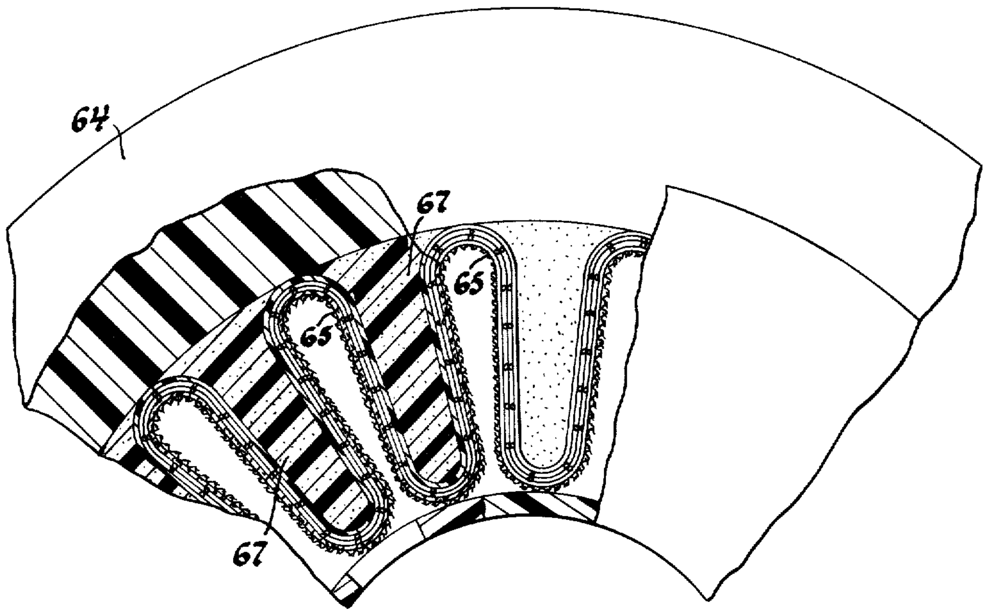
FIG. 5 is a cross-sectional view taken along line 5—5 of FIG. 1 that illustrates the sealed relationship between the spacer ring mounted exteriorly on the cartridge and the filter element.

FIG. 5 best illustrates the fluid seal relation between the spacer ring 64 and the filter element 62. The outer wall 52 is interrupted over the axial length of the spacer ring 64. The space within the pleats 65 up to ring 64 is filled with a water and/or solvent resistant glue or cement 67, such as urethane, with a slight excess applied. The spacer ring 64 is bonded to the slight excess glue at its points of tangency with the pleats 65.

The fluid seal between the spacer ring 64 and the inner wall of the housing body 14 defines two enclosed chambers or volumes 70 and 72. The enclosed volume 70 is bounded by the underside of the spacer ring 64, the inner surface of the housing wall 14, and the outer surface of the cartridge wall 52 and is confluent with the feed inlet port 20. In accordance with Pascal's Law, the fluid pressure within the enclosed volume 70 will be equal throughout and at the same level as the pressure at feed inlet port 20. The enclosed volume 72 is bounded by the upper side of the spacer ring 64, the inner surface of the housing wall 14 and the outer surface of the cartridge wall 52, and is confluent with the feed outlet port 22. The pressure in the enclosed volume 72 will be similarly equal throughout and at the same level as the pressure in the feed outlet port 22.

Figure 2:
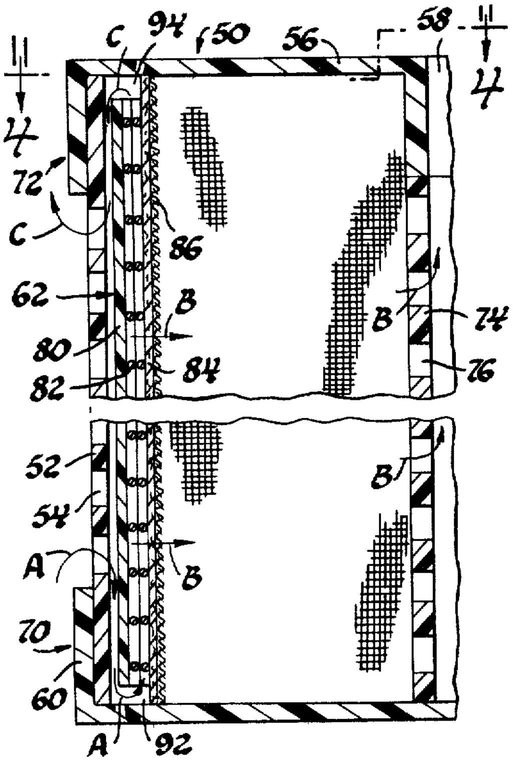
FIG. 2 is a cross-sectional view of a filter cartridge within the fluid purification system of FIG. 1 that illustrates the respective flow paths for feed liquid and filtrate within the filter cartridge.

Reference is now made to FIG. 2, which is a broken, cross-sectional view through the filter cartridge 50. This view if provided as a means for both illustrating the internal construction of the filter cartridge 50, and the flow paths of the feed liquid and filtrate within the cartridge.

The filter cartridge 50 includes, in pertinent part, the cylindrical wall 52 formed of semi-rigid plastic material. The wall 52 has a regular arry of relatively large apertures 54 that permit free flow of feed liquid through the wall. The upper cap 56 closes the upper end of the cartridge, except the central opening 58. The central opening 58 is continuous through the cartridge 50 along its longitudinal axis. The central opening 58 is defined over its major length through the cartridge by a tubular member 74 formed of semi-rigid plastic material. The tubular member 74 has a regular array of relatively large pores 76 that permit free flow therethrough. The central opening 58 within the porous tubular member 76 is in fluid communication with the filtrate port 24 and is used for the collection and channeling of filtrate.

Figure 3:
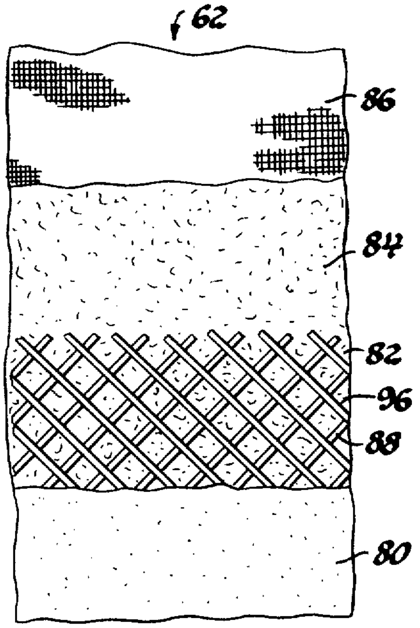
FIG. 3 is an illustration of the layered construction of the filter element within the filter cartridge.

The filter element, generally at 62, is formed into a cylindrical shape and is contained within the inner surface of the cartridge wall 52. The layered construction of the filter element 62 is best illustrated in the view of FIG. 3.

The filter element 62 is formed of a layered construction comprising a first sheet 80 of flexible, impervious material, e.g. Mylar plastic sheet material. The first sheet 80 defines one wall of a relatively thin flow channel through the filter element. A second sheet of permeable membrane material 84 is spaced from the first sheet 80. The choice of a specific membrane material depends upon the size of the particles or molecules to be filtered. Stated otherwise, the membrane material should have a porosity or permeability that is selective of the particles or molecules to be filtered. The membrane material 84 defines the other wall of the thin flow channel through the filter element. The thickness of the thin flow channel is a function of the viscosity charateristics of the feed liquid and may vary through an approximate range of 25 microns to 0.5. centimeter. The spacing between the first sheet 80 and the second sheet 84 is maintained by a sheet of perforated fabric 82. The perforated fabric is formed of a first set of spaced, parallel strands 88 overlaid with a second set of spaced, parallel strands 90 oriented transversely with respect to the first set to define a non-woven reticular pattern. The strands 88 and 90 may, for example, be formed of polymeric monafilament. The patent to Janneck, U.S. Pat. No. 4,022,692, discloses a perforated fabric material that is suitable for use in this application.

The spacing of the first sheet 80 and the second sheet 84 by the sheet of perforated fabric 82 maintains not only the thin flow channel between the first and second sheets, but also promotes turbulent flow within the flow channel. The turbulent flow tends to promote mixing of the feed liquid and avoid buildup of filtered species at the boundary layer of the membrane. It is within the scope of the present invention to create the desired channel space and turbulent flow by forming indentations or other relieved features on the inner surface of the sheet of impervious material 80.

The second sheet of membrane material 84 is backed by a third sheet 86 of relatively tenacious screen material to provide a support backing for a membrane material.

Referring again to FIG. 2, it can be seen that the outer surface of filter element 62 is defined by the first sheet 80 of relatively impermeable material, and the inner surface is defined by the second sheet 84 of membrane material which is backed by a third sheet 86 of screen material. In addition, the second sheet 84 of membrane material extends beyond sheet 80 and is glued or cemented to secure it in a fluid seal at both its upper and lower ends with the upper cap 56 and lower cap 60, respectively. The securement of the second sheet 84 of membrane material at its lower end defines an ingress opening 92 to the thin flow channel within the filter element 62. Likewise, the securement of the upper end of the second sheet 84 of membrane material with the upper can 56 defines an egress opening 94 from the thin flow channel. As shown by the flow-depicting arrows in FIG. 2, in this preferred arrangement the direction of flow of the feed liquid into and out of the channel is at an angle to the flow axis of the channel.

Figure 4:
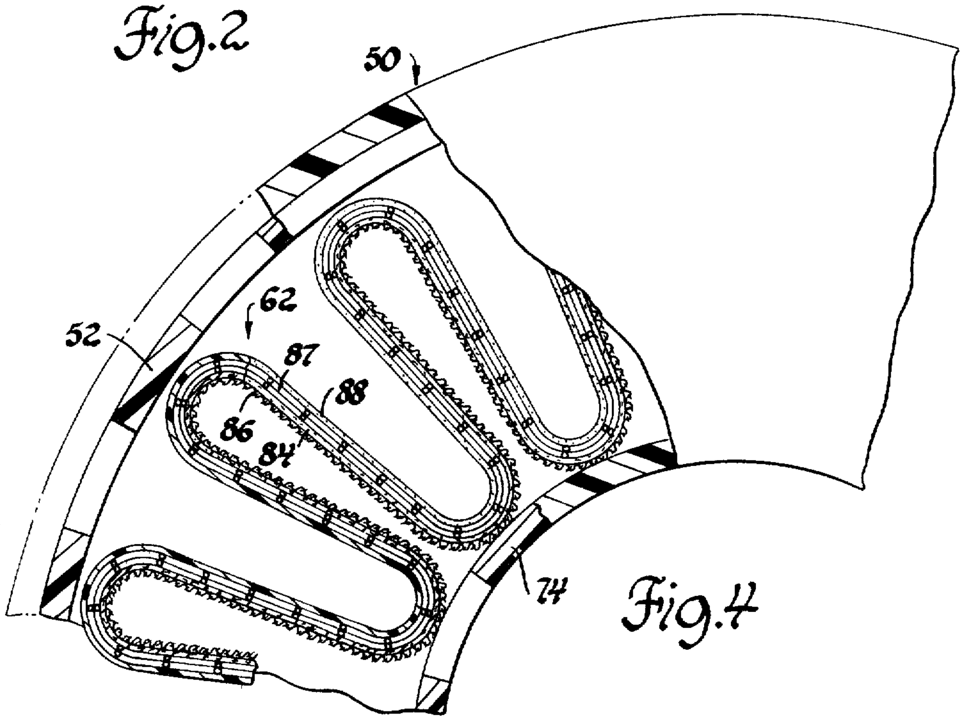
FIG. 4 is a cross-sectional view taken along line 4—4 of FIG. 2 that illustrates the pleated construction of the filter element within the filter cartridge.

The pleated construction of the filter element 62 is best illustrated in the sectional view of FIG. 4. The filter element 62 is shown contained between the central tubular member 74 and the outer cylindrical wall 52. The filter element 62 is folded into pleats and brought into a cylindrical shape by joining the opposed lateral sides of the filter element with a fluid-tight longitudinal seam. The pleated arrangement tends to maximize the membrane surface-to-membrane volume ratio of the filter element 62. The outer surface of the filter element is defined by the first sheet 80 of impervious material, and the inner surface is defined by the second sheet 84 of permeable membrane material, which is backed by the third sheet 86 of support screen. The spacing between the first sheet 80 and the second sheet 84 is maintained by an interposed sheet of perforated fabric 82.

Again referring to FIG. 2, the process by which filtration occurs is described as follows.

Feed liquid within the enclosed volume 70 enters through the pores 54 of the outer cylindrical wall 52 of the filter cartridge 50. The feed liquid flows down in the direction of arrows A into the ingress opening 92 of the thin flow channel within the filter element 62. The feed liquid flows upwardly under pressure through the thin flow channel within the filter element 62. The presence of the thin sheet of perforated fabric 82 within the flow channel tends to create turbulence in the flow along the channel. The turbulent flow across the surface of the second sheet 84 of membrane material facilitates the permeation of liquid through the membrane material as filtrate. The filtrate flows in the direction indicated by the arrows B toward the central opening 58 of the cartridge 50. In reaching the central opening 58 the filtrate flows through the pores 76 of the central tubular member 74 which collects the filtrate and channels it off to the filtrate port.

The feed liquid continues through the thin flow channel within the filter element 62 until it reaches the egress opening 94 at the upper end of the filter element. The feed liquid flows out of the filter cartridge 50 in the manner indicated by the arrows C. Specifically, the feed liquid passes from the egress opening 94 and through the pores 54 in the cylindrical wall 52 to the enclosed volume 72 and eventually out through the feed outlet port.

In another feature of the invention, the first sheet of impervious material 80 can have a small number of pore openings distributed over its surface. Each of the pore openings is to be sufficient size to allow the unfiltered feed liquid to pass therethrough, i.e. each is large enough to be non-selective of any of the constituents of the feed liquid. By limiting to a small amount the number of such pore openings, a controlled amount of feed liquid can make intermittent entry into the thin flow channel part-way therealong, instead of flowing into the normal ingress opening 92. The amount of intermittent entry is preferably kept at less than 50% of the total flow through the channel. This tends to decrease the pressure differential between the ingress and egress openings 92 and 94 of the filter element 62 without a proportionate decrease in the mass flux through the thin flow channel. In this manner, the impervious material 80 can be regarded as a pressure regulator that tends to decrease the pressure differential along the length of the flow channel to promote a more linear permeation of filtrate through the second sheet 84 of permeable membrane material to optimize the filtration process.

With respect to the properties of the second sheet 84, it is known in the art that the prolonged filtration of certain solutions, such as hydrous Zr(IV)oxide, through a barrier initially permeable only to dispersed particulate matter, results in the formation of a new barrier which is impermeable even to dissolved salts. Descriptions of this process are to be found in U.S. Pat. No. 3,503,789, J. S. Johnson, Jr. et al, "Method of Making a Dynamic Solute Rejecting Membrane", Mar. 31, 1970; U.S. Pat. No. 3,577,339 J. N. Baird, Jr. et al, "Filtration Method of Separating Liquids from Extraneous Materials", May 4, 1971; and, U.S. Pat. No. 3,743,595, J. S. Johnson, Jr., "Dual-layer Hyperfiltration Membrane and Process for Using Same", July 3, 1973. The present invention has been found to be particularly suitable for carrying out the process due to substantial savings in pumping energy. Because of the turbulence promoter screen in the thin channel, the process can be carried out at tangential flow velocities of only 3–5 ft/sec, with a performance characteristic of velocities of 15–25 ft/sec.

In another embodiment, the invention may be used for diafiltration and/or dialysis. In this application the cartridge and filter element are modified to accommodate two adjacent thin flow channels which share a common membrane boundary. One thin flow channel is provided to carry a flow of feed liquid, and the other thin flow channel is provided to carry a counter-flow of dialyzate.

With reference to FIGS. 6–9, a modified filter cartridge useful for dialysis is shown generally at 150. The dialysis filter cartridge 150 has the same basic external configuration as the cartridge 50 of FIGS. 1 and 2, subject to minor variations to be hereinafter described. The internal configuration of the filter cartridge 150, and especially its modified filter element 162, are substantially changed from the earlier described cartridge 50. The only changes required to adapt the housing 10 to the present dialysis operation is to modify the lower end segment 18 to include a second flow port in a manner similar to the upper end segment 16, and to connect conventional pump means with the newly added second flow port to provide a pressure differential for a second thin flow channel.

Figure 6:
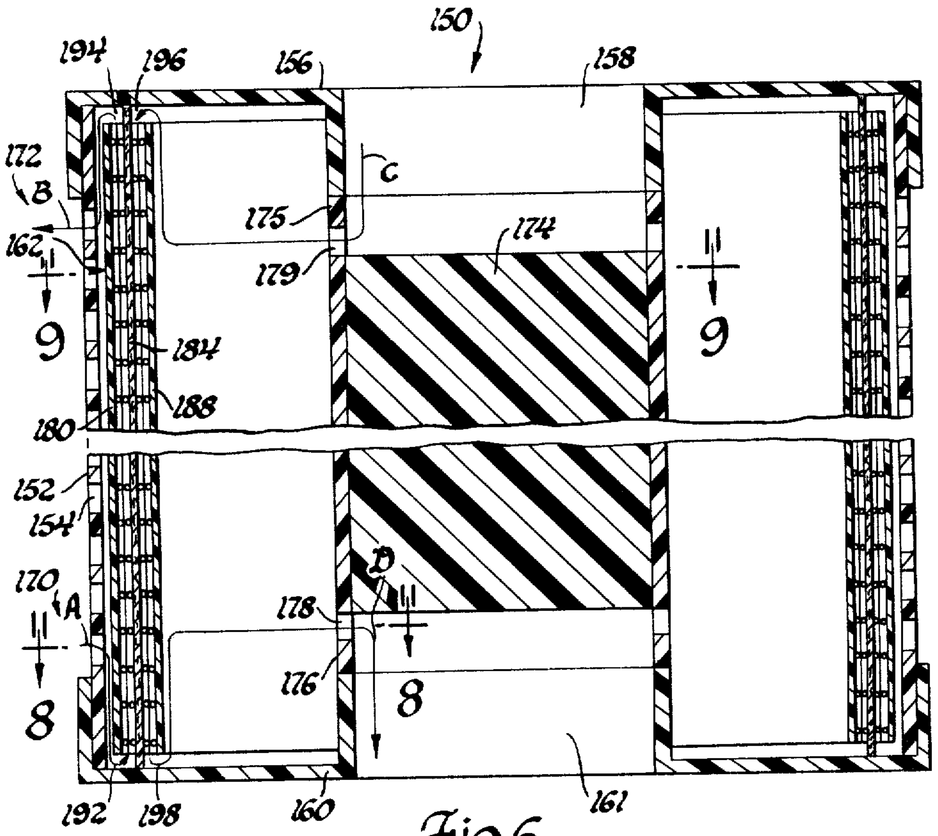
FIG. 6 is an illustration of the layered construction of a filter element useful for diafiltration and/or dialysis.

With particular reference to FIG. 6, the cartridge 150 has a general cylindrical shape defined by an outer wall 52 formed of a semi-rigid plastic material. The outer wall 152 has a regular array of large apertures, as for example aperture 54, that permit the relatively free passage of feed liquid through its surface.

An upper cap closes all but a central opening 158 in the upper end of the cartridge 150. The central opening 158 communicates a dialyzate port in an associated filter housing (corresponding to filtrate port 24 in the earlier-described embodiment of the invention) with a second thin flow channel in a filter element 162 that is to be hereinafter described in greater detail. The upper cap 156 is secured to the cylindrical wall 152 with a water and/or solvent resisting glue.

A lower cap 160 closes all but a central opening 161 at the lower end of the cartridge 150. The central opening 161 communicates an external housing port (not shown) with the second thin flow channel in the filter element 162. The cap 160 is likewise secured to the cylindrical wall 152 by water and/or solvent resisting glue.

The filter element is generally indicated at 162. As will be made more apparent in the description of FIGS. 7 and 8, the filter element 162 has a layered construction that includes two thin flow channels which share a common membrane boundary. One thin flow channel is provided for a contaminant-laden feed liquid, and the other thin flow channel for dialyzate. The feed liquid and dialyzate flow in mutually opposite directions in each of their respective thin flow channels.

As previously indicated, the external configuration in the cartridge 150 is like that of the cartridge 50 of FIG. 1 except as otherwise specifically noted. The cartridge 150 includes a spacer ring (not shown) that is in all respects similar to the spacer ring 64 of FIG. 1. The spacer ring engages the interior wall of a housing that is adapted to receive the cartridge 150 and forms a fluid seal therewith. This fluid seal defines two enclosed chambers or volumes 170 and 172. The enclosed volume 170 is bounded by the underside of the spacer ring, the interior wall of the housing, and the outer surface of the cartridge wall 152. The enclosed volume 172 is bounded by the upper side of the spacer ring, the interior wall of the housing, and the outer surface of the cartridge wall 152.

The central opening 158 of the upper cap 156 adjoins an annular segment 175 formed of a semi-rigid material similar to the material of which the outer wall 152 is formed. The annular segment 175 includes a plurality of apertures 179 distributed over its circumference. Similarly, the central opening 161 of the lower cap 160 adjoins another annular segment 176. The annular segment 176 is in all respects alike and complementary to the annular segment 175, and specifically includes a similar plurality of apertures 178.

The central openings 158 and 161 are isolated by a central, longitudinal plug 174 of cylindrical shape. A glue or cement 167, such as urethane, fills the space between the plug 174 and pleats 165 to assure a fluid tight seal. In this manner, the central openings 158 and 161 are effectively in fluid isolation from one another.

Referring again to FIG. 6, the filter element 162 includes two thin flow channels; one for feed liquid, and another for dialyzate. The filter element 162 comprises a layered construction which is best illustrated in FIG. 7.

Figure 7:
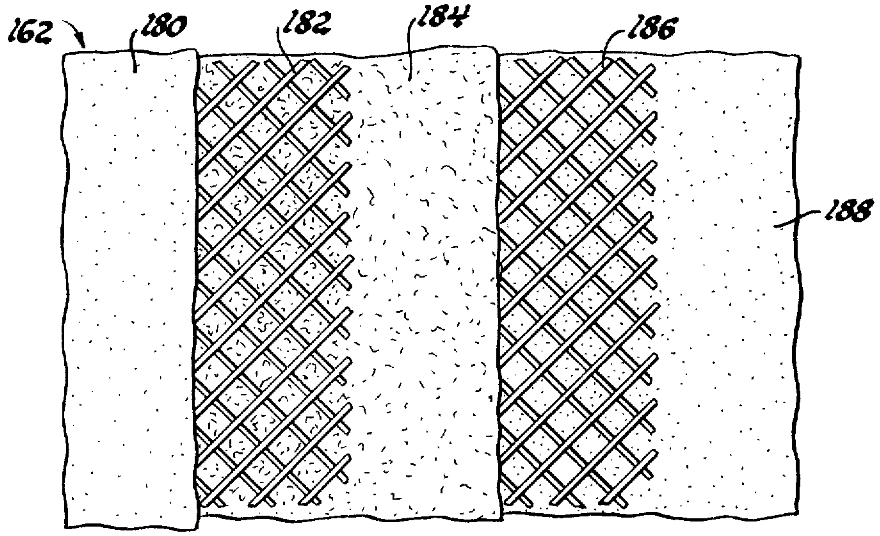
FIG. 7 is a cross-sectional view of a modified form of filter cartridge that is useful for diafiltration and/or dialysis, and which particularly illustrates the flow paths for feed liquid and dialyzate

In FIG. 7, the filter element 162 is made up of five layers of sheet material. A first sheet consisting of impervious material 180, such as Mylar, defines an outer wall of one flow channel. A sheet of perforated fabric 182 is positioned adjacent to the first sheet 180. The perforated fabric may be identical to the sheet of perforated fabric 82 shown and described in connection with FIG. 3. The perforated fabric 182 has two functions; first, it promotes turbulence in flow along the flow channel in which it is disposed; and, secondly, it maintains spacing between adjacent layers or sheets which it lies between.

A second sheet consisting of permeable membrane material 184 is disposed adjacent to the sheet of perforated fabric 182. The second sheet 184 defines the other wall of a first thin flow channel between it and the first sheet of impervious material 180.

Another sheet of perforated fabric 186, alike the sheet 182, is disposed adjacent the second sheet of membrane material 184. The sheet of perforated fabric 186 provides the same function as the sheet of perforated fabric 182. However, in certain applications, such as the diafiltration of shear sensitive solutions, e.g. blood, fabric 186 may be a spacer only with little or no turbulence promotion characteristics.

A third sheet consisting of impervious material 188 is disposed adjacent the sheet of perforated fabric 186. The third sheet 188 defines one wall of a second thin flow channel. The other wall is defined by the second sheet of permeable membrane material 184. The second sheet of membrane material 184 serves as a common boundary for both of the thin flow channels just defined.

Figure 8:
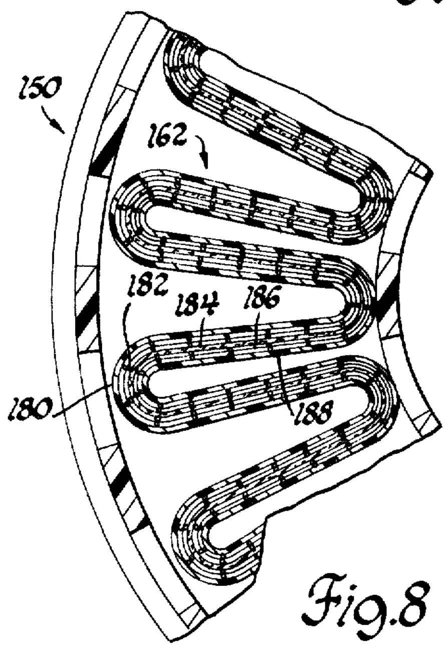
FIG. 8 is a cross-sectional view taken along line 8—8 of FIG. 7 that illustrates the pleated construction of the filter element used in the modified form of filter cartridge.
Figure 9:
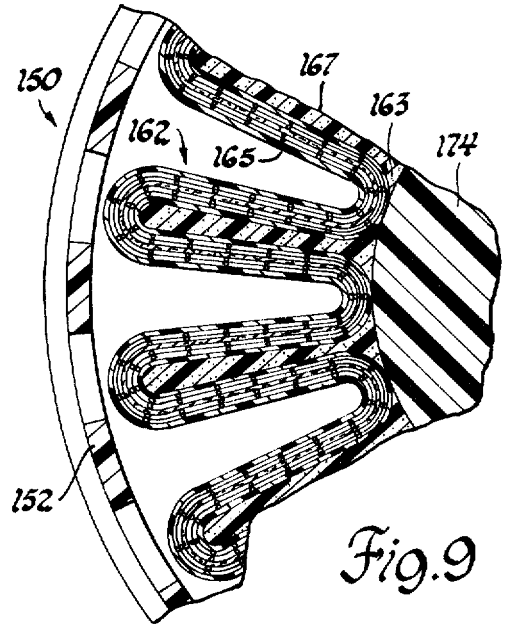
FIG. 9 is a cross-sectional view taken along line 9—9 of FIG. 7 that illustrates the sealed relationship between the central core of the filter cartridge and the filter element.

Referring now to FIG. 8, the filter element 162 is folded into pleats and placed into a cylindrical shape within the cartridge 150. The first sheet of impervious material 180 defines the outer surface of the filter element. The one sheet of perforated fabric 182 is adjacent the first sheet 180 in the first thin flow channel. The second sheet of permeable membrane. material 184 defines the central layer of the filter element and the other wall of the first thin flow channel. The other sheet of perforated fabric 186 is positioned adjacent the second sheet of permeable membrane material 184 in the second thin flow channel. The third sheet of impervious material 188 defines the inner surface of the filter element and one wall of the second thin flow channel.

Referring again to FIG. 6, it can be seen that the second sheet of permeable membrane material 184 extends beyond either sheet of impervious material 180 and 188 to reach the upper and lower caps 156 and 160. The second sheet of membrane material is potted and sealed to the respective upper and lower end caps 156 and 160 to form a fluid seal therewith.

The sealed relationship defines ingress and egress openings from both of the thin flow channels within the filter element 162. Specifically, the first thin flow channel has an ingress opening 192 at its lower end, and an egress opening 194 at its upper end. The second thin flow channel has an ingress opening 196 at its upper end, and an egress opening 198 at its lower end.

In operation of the filter cartridge 150 of the present invention, one thin flow channel is used to carry a flow of contaminant-laden feed liquid, and the other thin flow channel is used to carry a counterflow of dialyzate.

More specifically, the feed liquid in volume 170 enters the cartridge 150 through the pores 154 of the outer wall 152. The feed liquid flows along the direction indicated by arrow A to the ingress opening 192 of the first thin flow channel. The feed liquid then flows upwardly through the first thin flow channel where contaminants are passed through the sheet of permeable membrane material 184 into the second thin flow channel. The concentrated feed liquid flows out of the first thin flow channel through the egress opening 194 into the enclosed volume 172 along the direction indicated by arrow B.

The dialyzate flows through the second thin flow channel in a counter or opposite direction. More specifically, dialyzate is introduced through the central opening 158 and passes through the pores 179 in the direction indicated by arrow C. The dialyzate enters the ingress opening 198 through the pores 178 and out the central opening 161 along the direction indicated by arrow D.

In another feature of the invention, the first sheet of impervious material 180 may be provided with a limited number of pores of sufficient dimension to permit unfiltered feed liquid to make intermittent entry into the first thin flow channel. The provision of a small number of non-selective pores tends to decrease the pressure differential between egress and ingress openings 192 and 194 of the filter element 162 without a proportionate decrease in the mass flux through the first thin flow channel.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims, the invention may be practiced otherwise than as specifically described.

We claim:

1. A filter element for use in a cross-flow filtration system comprising a cylindrical composite sheet including an outer sheet of flexible, impervious material and an inner sheet of selective, permeable membrane material spaced from the outer sheet to form a flow channel for a feed fluid therebetween, the composite sheet being folded into radially projecting pleats along fold lines which define a flow axis parallel to the longitudinal axis of the cylindrical composite sheet, and having an opening at each end of said flow channel to permit flow of the feed fluid into said channel at one end thereof, then through the channel along the flow axis and over the surface of the selective, permeable membrane material to cause separation of constituents from the feed fluid by passage of the constituents through the selective, permeable membrane material to the interior of said cylindrical composite sheet, and then out of said channel at the other end thereof; an end cap at each end of said cylindrical composite sheet to which said sheet of selective, permeable membrane material is sealingly secured; and means for conducting from the interior of said cylindrical composite sheet the constituents separated from said feed fluid.

2. An element as set forth in claim 1 further including means between said inner and outer sheets for maintaining the spacing therebetween uniform and for promoting turbulence in flow through said channel.

3. An element as set forth in claim 1 further including a sheet of perforated fabric between said inner and outer sheets.

4. An element as set forth in claim 1 wherein said openings are arranged such that the feed fluid is caused to flow into and out of the flow channel at an angle to the flow axis of the channel.

5. An element as set forth in claim 1 wherein said inner sheet extends beyond said outer sheet at each end of said channel thereby to provide said openings.

6. An element as set forth in claim 1 further including a ring sealingly secured to the outer surface of said cylindrical composite sheet intermediate said openings and adapted to sealingly engage an inner surface of a cylindrical housing for said filter element.

7. An element as set forth in claim 1 wherein the outer sheet of impervious material has formed in it along the flow axis a plurality of spaced pores of sufficient dimensions to be non-selective thereby to permit entry of feed fluid through said pores along the flow axis to linearize the pressure gradient therealong.

8. An element as set forth in claim 1 wherein said means includes an opening in at least one of said end caps and a perforated tube in the interior of said cylindrical composite sheet communicating with said opening.

9. An element as set forth in claim 1 wherein said means comprises a second sheet of flexible, impervious material disposed in spaced relation with the inner sheet of membrane material on the side opposite the outer sheet of impervious material to define a second flow channel having a fluid opening at each end thereof.

10. An element as set forth in claim 9 further including means for maintaining the spacing between the inner sheet and each of the other sheets.

11. An element as set forth in claim 9 further including a sheet of perforated fabric between said inner and outer sheets and a sheet of perforated fabric between said inner sheet and said second sheet of flexible, impervious material.

12. An element as set forth in claim 9 wherein the openings at the ends of said channels are arranged such that the fluid flow into and out of the channels is at an angle to fluid flow in the channels.

13. An element as set forth in claim 9 wherein said inner sheet extends beyond the other sheets at each end of said channels thereby to provide said openings at the ends of the channels.

14. A filter element for use in a cross-flow filtration system comprising a cylindrical composite sheet including an outer sheet of flexible, impervious material and an inner sheet of selective, permeable membrane material spaced from the outer sheet to form a flow channel for a feed fluid therebetween, the composite sheet being folded into radially projecting pleats along fold lines which define a flow axis parallel to the longitudinal axis of the cylindrical composite sheet, and having an opening at each end of said flow channel to permit flow of the feed fluid into said channel at one end thereof, then through the channel along the flow axis and over the surface of the selective, permeable membrane material to cause separation of constituents from the feed fluid by passage of the constituents through the selective, permeable membrane material to the interior of said cylindrical composite sheet, and then out of said channel at the other end thereof; and end cap at each end of said cylindrical composite sheet to which said sheet of selective, permeable membrane material is sealingly secured, at least one of said end caps having an opening therethrough; a perforated tube in the interior of said composite sheet communicating with the opening in the end cap for conducting from the interior of said cylindrical composite sheet the constituents separated from said feed fluid; and a ring sealingly secured to the exterior of said composite sheet intermediate said channel openings and adapted to sealingly engage a cylindrical housing surrounding said filter element whereby fluid in the housing at one end thereof exterior of the composite sheet can reach the other end of the housing only by flowing through said flow channel.

15. An element as set forth in claim 14 including means in said flow channel for promoting turbulence in the flow of fluid therethrough.

16. An element as set forth in claim 14 wherein said inner sheet extends beyond said outer sheet at each end of said channel thereby to provide said openings.

17. A dialysis element comprising a cylindrical composite sheet including a first sheet of flexible, impervious material, a sheet of selective, permeable membrane material spaced from the first sheet to form a flow channel between said sheet of membrane material and said first sheet, a second sheet of flexible, impervious material spaced from the sheet of membrane material on the side opposite the first sheet to form a flow channel between said sheet of membrane material and said second sheet, said composite sheet being folded into radially projecting pleats along fold lines which define a flow axis for each of said flow channels parallel to the longitudinal axis of the cylindrical composite sheet; an end cap at each end of said composite sheet to which said sheet of membrane material is sealingly secured; one of said flow channels having an opening at each end thereof to permit a feed fluid to flow through said one flow channel along said flow axis and against a surface of said sheet of membrane material, and the other of said flow channels having an opening at each end thereof to permit a dialyzate to flow through said other flow channel along said flow axis and against the other surface of said sheet of membrane material.

18. A dialysis element as set forth in claim 17 including means in at least one of said channels for promoting turbulence in fluid flow through the channel.

19. A dialysis element as set forth in claim 17 wherein said sheet of selective, permeable membrane material extends beyond said sheets of impervious material at each of the ends thereof thereby to provide said openings at the ends of the channels.

20. A dialysis element comprising a cylindrical composite sheet including an outer sheet of flexible, impervious material, an inner sheet of flexible, impervious material, a sheet of selective, permeable membrane material between and spaced from said outer and inner sheets thereby to form a first flow channel between said sheet of membrane material and said outer sheet and a second flow channel between said sheet of membrane material and said inner sheet, said inner sheet defining a central opening extending longitudinally of said cylindrical composite sheet, an end cap at each end of said cylindrical composite sheet to which said sheet of membrane material is sealingly secured, at least one of said end caps having an opening therethrough communicating with said central opening, said first flow channel having an opening at each end thereof communicating with the exterior of said cylindrical composite sheet for flow through said first flow channel of a fluid along the flow axis and over one surface of the sheet of membrane material and said second flow channel having an opening at each end thereof communicating with said central opening for flow through said second flow channel of a fluid along the flow axis over the other surface of the sheet of membrane material, a wall in said central opening intermediate the openings of said second flow channel and sealingly secured to said inner sheet whereby fluid entering said central opening through the opening in one of said end caps can reach the other end of said central opening only by flowing through said second flow channel, and a ring sealingly secured to said outer sheet intermediate the openings of said first flow channel and adapted for sealing engagement with a cylindrical housing around said cylindrical composite sheet whereby fluid in the housing at one end thereof and exterior of said cylindrical composite sheet can reach the other end of said housing only by flowing through said first flow channel.

21. A fluid purification system comprising a cylindrical housing having a feed fluid inlet and a feed fluid outlet, a cylindrical composite sheet positioned in said housing in spaced relationship therewith thereby to provide an annular space in said housing exterior of said cylindrical composite sheet, said cylindrical composite sheet including an outer sheet of flexible, impervious material and an inner sheet of selective, permeable membrane material spaced from the outer sheet to form a flow channel for a feed fluid therebetween, the composite sheet being folded into radially projecting pleats along fold lines which define a flow axis parallel to the longitudinal axis of the cylindrical composite sheet, and having an opening at each end of said flow channel to permit flow of the feed fluid from said space in said housing into said channel at one end thereof, then through the channel along the flow axis and over the surface of the selective, permeable membrane material to cause separation of constituents from the feed fluid by passage of the constituents through the selective, permeable membrane material to the interior of said cylindrical composite sheet, and then out of said channel and into said space in said housing at the other end thereof; an end cap at each end of said cylindrical composite sheet to which said sheet of selective, permeable membrane material is sealingly secured; means for conducting from the interior of said cylindrical composite sheet and from said housing the constituents separated from said feed fluid; and a ring in sealed engagement with the exterior of said composite sheet and with said housing intermediate said openings and intermediate said inlet and outlet whereby fluid entering the housing through the inlet thereof can reach the outlet of the housing only by flowing through said flow channel.

22. A system as set forth in claim 21 including means for conducting a portion of the fluid from said outlet to said inlet whereby the feed fluid is repeatedly flowed through said channel.

23. A system as set forth in claim 21 wherein said means comprises an opening in at least one of said end caps and a perforated tube in the interior of said composite sheet communicating with said opening.

24. A system as set forth in claim 21 wherein said means comprises a second sheet of flexible, impervious material disposed in spaced relation with the inner sheet of membrane material on the side opposite the outer sheet of impervious material to define a second flow channel having a fluid opening at each end thereof, a second fluid inlet in said housing communicating with the opening at one end of said second channel and a second fluid outlet in said housing communicating with the opening at the other end of said second channel.

* * * * *